US009315156B1

(12) United States Patent
Nedelman

(10) Patent No.: US 9,315,156 B1
(45) Date of Patent: Apr. 19, 2016

(54) VEHICLE AND LOAD FLOOR FOR A VEHICLE

(71) Applicant: FORD GLOBAL TECHNOLOGIES, LLC, Dearborn, MI (US)

(72) Inventor: Marc David Nedelman, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 14/505,967

(22) Filed: Oct. 3, 2014

(51) Int. Cl.
*B60R 5/00* (2006.01)
*B60R 5/04* (2006.01)

(52) U.S. Cl.
CPC ...................................... *B60R 5/045* (2013.01)

(58) Field of Classification Search
CPC ........ B62D 43/00; B62D 43/06; B62D 43/10; B60R 5/045
USPC .................................. 296/37.16, 37.14, 37.2
See application file for complete search history.

(56) References Cited

U.S. PATENT DOCUMENTS

| 6,152,502 | A | 11/2000 | Rossi |
| 6,644,709 | B2 * | 11/2003 | Inagaki ................ B60N 2/3013 296/37.14 |
| 7,784,841 | B2 | 8/2010 | Watson et al. |
| 8,011,413 | B2 | 9/2011 | Poppema |
| 8,469,411 | B2 | 6/2013 | Costigan |
| 8,596,703 | B2 | 12/2013 | Nedelman |
| 2013/0241215 | A1 | 9/2013 | Halliwell et al. |

FOREIGN PATENT DOCUMENTS

| EP | 2105352 A1 | 9/2009 |
| GB | 1068162 A | 5/1967 |
| GB | 1198535 A | 7/1970 |
| JP | 2004176308 A | 6/2004 |
| JP | 2009057773 A | 3/2009 |

* cited by examiner

*Primary Examiner* — Joseph D Pape
(74) *Attorney, Agent, or Firm* — Vichit Chea; Brooks Kushman P.C.

(57) ABSTRACT

A vehicle is provided. The vehicle includes a load floor. The load floor is movable from a closed position to an open position in order to provide access to a storage cavity thereunder. A spring-loaded retractable device is attached to the load floor. The spring-loaded retractable device is configured to extend from the load floor and secure the load floor to the vehicle in the open position.

18 Claims, 3 Drawing Sheets

VEHICLE AND LOAD FLOOR FOR A VEHICLE

TECHNICAL FIELD

The present disclosure relates to vehicles and load floors for vehicles.

BACKGROUND

Many vehicles include load floors in vehicle trunks or cargo areas. Load floors may provide support for objects that are placed onto the load floor. Storage cavities located below load floors may be accessed when the load floor is displaced.

SUMMARY

In one aspect of the disclosure, a vehicle is disclosed. The vehicle includes a load floor that partially defines a trunk of the vehicle. The load floor is movable from a closed position to an open position in order to provide access to a storage cavity thereunder. A spring-loaded retractable device is attached to the load floor. The spring-loaded retractable device is configured to extend from the load floor and secure the load floor to the vehicle in the open position. The spring-loaded retractable device may include an extendable/retractable wire. A first end of the extendable/retractable wire may be connected to a spool. A second end of the extendable/retractable wire may be connected to a hook that secures the load floor to the vehicle in the open position. A torsional spring connected to the spool may bias the hook in a retraced position. The hook may be retractable into a recess in the load floor.

In another aspect of the disclosure, a vehicle is disclosed. The vehicle includes a load floor that defines an aperture. A trim assembly is mounted within the aperture. The trim assembly has a handle and a spring-loaded retractable device that are arranged on opposing sides of the load floor. The handle is configured to assist in moving the load floor from a closed position to an open position. The spring-loaded retractable device is configured to secure the load floor to the vehicle in the open position. The handle of the trim assembly may be arranged on a top side of the load floor and the spring-loaded retractable device of the trim assembly may be arranged on a bottom side of the load floor. A cover plate may be secured to the bottom side of the load floor and the cover plate may have a slot for accessing the spring-loaded retractable device. The spring-loaded retractable device may be retractable into a recess in the trim assembly. The spring-loaded retractable device may include an extendable/retractable wire. A first end of the extendable/retractable wire may be connected to a spool and the spool may be rotatably connected to the trim assembly. A second end of the extendable/retractable wire may be connected to a hook that secures the load floor to the vehicle in the open position. A torsional spring connected to the spool may bias the hook in a retraced position. The handle may have an open position and a closed position. The handle may be biased in the closed position.

In yet another aspect of the disclosure, a vehicle is disclosed. The vehicle includes a load floor movable from a closed position to an open position in order to provide access to a storage cavity thereunder. A trim assembly is disposed on the load floor. A handle is connected to a top side of the trim assembly. A spool is connected to a bottom side of the trim assembly. An extendable/retractable wire is connected to the spool at a first end of the extendable/retractable wire. A hook is connected to a second end of the extendable/retractable wire. The hook is configured to extend from the load floor and secure the load floor to the vehicle in the open position. A torsional spring is connected to the spool and configured to bias the extendable/retractable wire and the hook in a retracted position. The hook may be retractable into a recess in the trim assembly. The hook may be retracted into the recess when the load floor is in the closed position. The load floor may partially define a cargo area of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
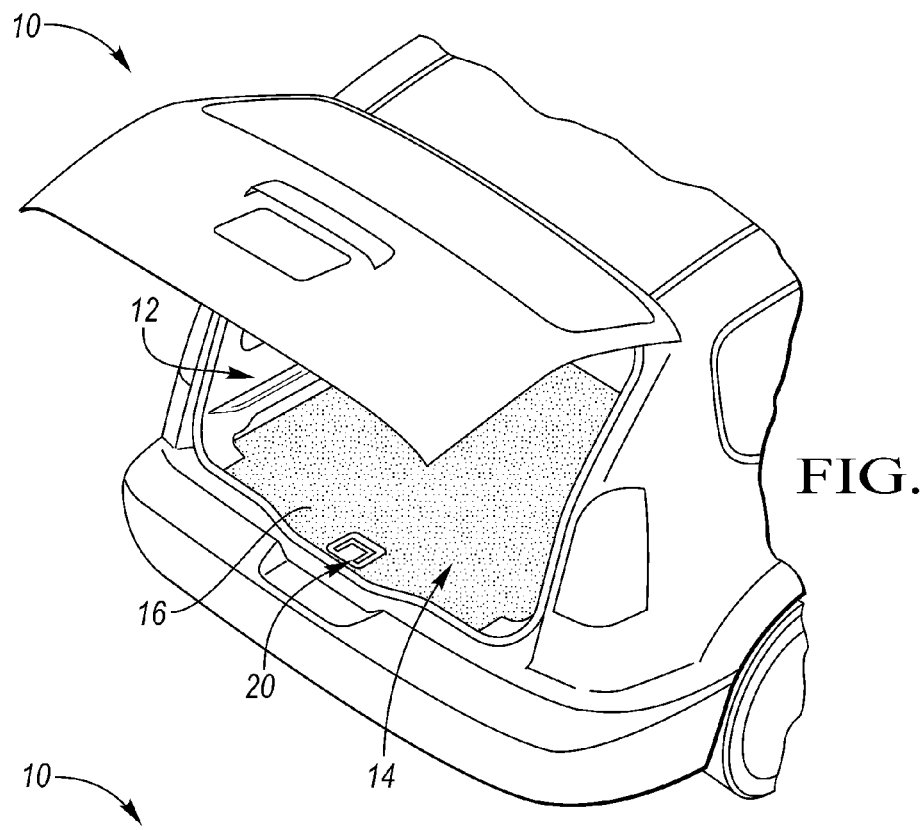
FIG. 1 illustrates a vehicle having a load floor in a closed position.
Figure 2:
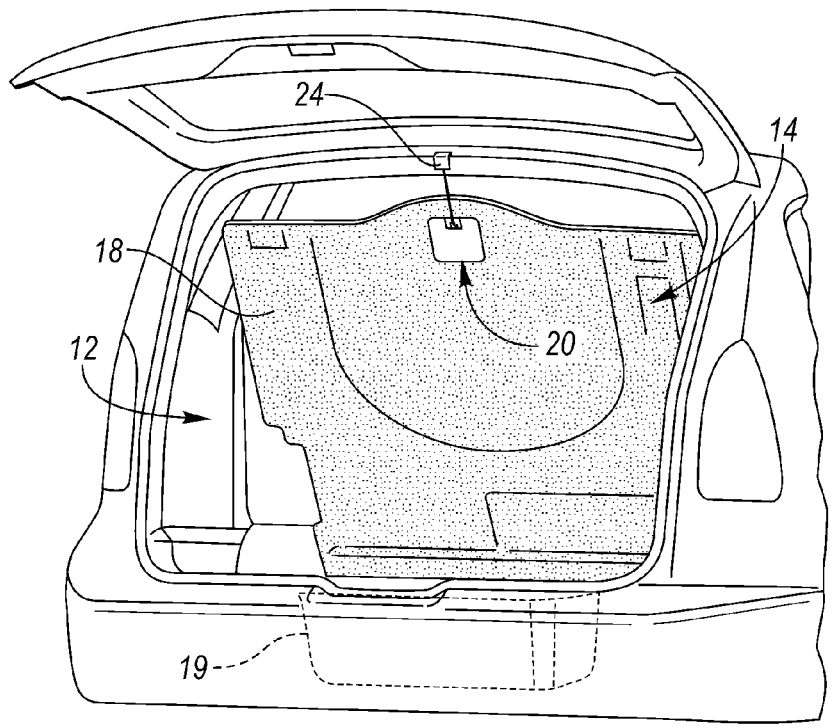
FIG. 2 illustrates the vehicle in FIG. 1 in which the load floor has been moved to an open position.

Referring to FIGS. 1 and 2, a vehicle 10 having a cargo area 12 (or trunk) is illustrated. Although the illustration shows a cargo area that is accessible through a hatch back, the disclosure should not be limited to embodiments where hatch backs allow access to the cargo area, but should include all cargo areas (including vehicle trunks) whether or not they are accessible by doors. The cargo area 12 includes a load floor 14 that partially defines the cargo area 12. The load floor 14 is shown in a closed position 16 in FIG. 1 and in an open position 18 in FIG. 2. The load floor 14 provides support for objects that are placed onto the load floor 14 when the load floor is in the closed position 16. The load floor 14 provides access to a storage cavity 19 that is located beneath the load floor 14 when moved into the open position 18. The load floor may be connected to the vehicle 10 at one end by a hinge that allows the load floor to pivot from the closed position 16 to the open position 18.

A trim assembly 20 is mounted within an aperture in the load floor 14. The trim assembly 20 includes a handle 22 that is located on a top side of trim assembly 20, and a spring-loaded retractable device 24 that is located on a bottom side of the trim assembly 20. The handle 22 and spring-loaded retractable device 24 are arranged on opposing sides of the load floor 14. The handle 22 may be arranged on a top side of the load floor 14 and the spring-loaded retractable device 24 may be arranged on a bottom side of the load floor 14. The handle 22 is configured to assist in moving the load floor 14 from the closed position 16 to the open position 18. The spring-loaded retractable device 24 is configured to extend from the load floor 14 and secure the load floor 14 to the vehicle in the open position 18, as shown in FIG. 2.

Figure 3:
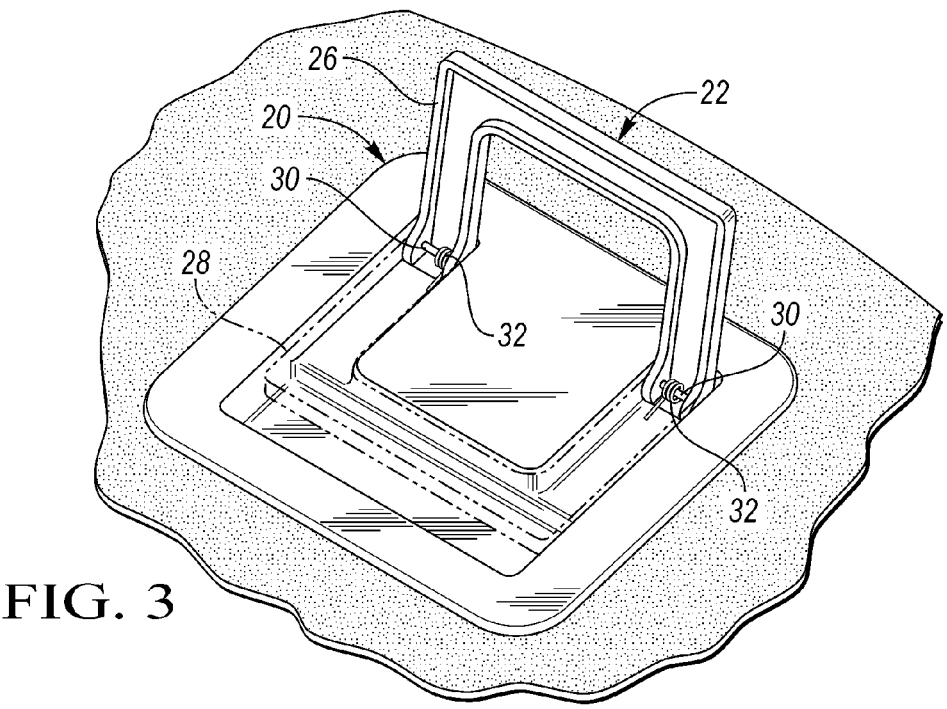
FIG. 3 illustrates a top side of a trim assembly having a handle in which the trim assembly is attached to the load floor.

Referring to FIG. 3, the top sides of the trim assembly 20 and load floor 14 are illustrated. The handle 22 is illustrated in both an open position 26 and a closed position 28 (shown in phantom). The handle 22 may be configured to rotate about a pivot, which may consist of one or a set of pins 30. The handle 22 may be biased in the closed position 28 by one or a series of springs 32. The springs 32 may be torsional springs.

Figure 4:
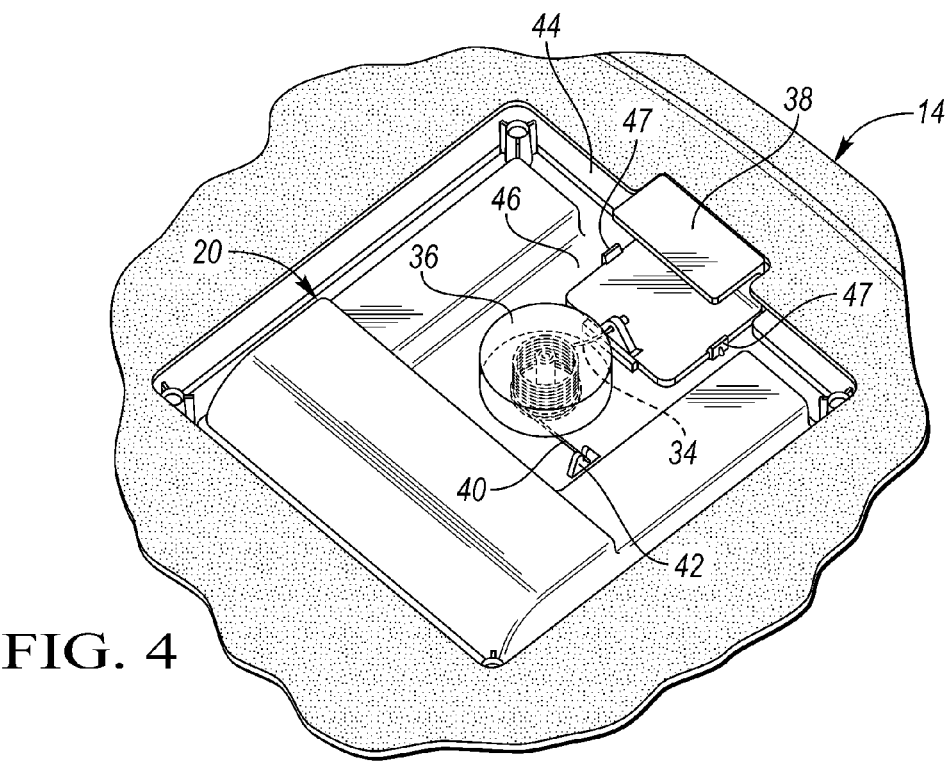
FIG. 4 illustrates a bottom side of the trim assembly having a spring-loaded retractable device in which the trim assembly is attached to the load floor and the spring-loaded retractable device is in a retracted position.
Figure 5:
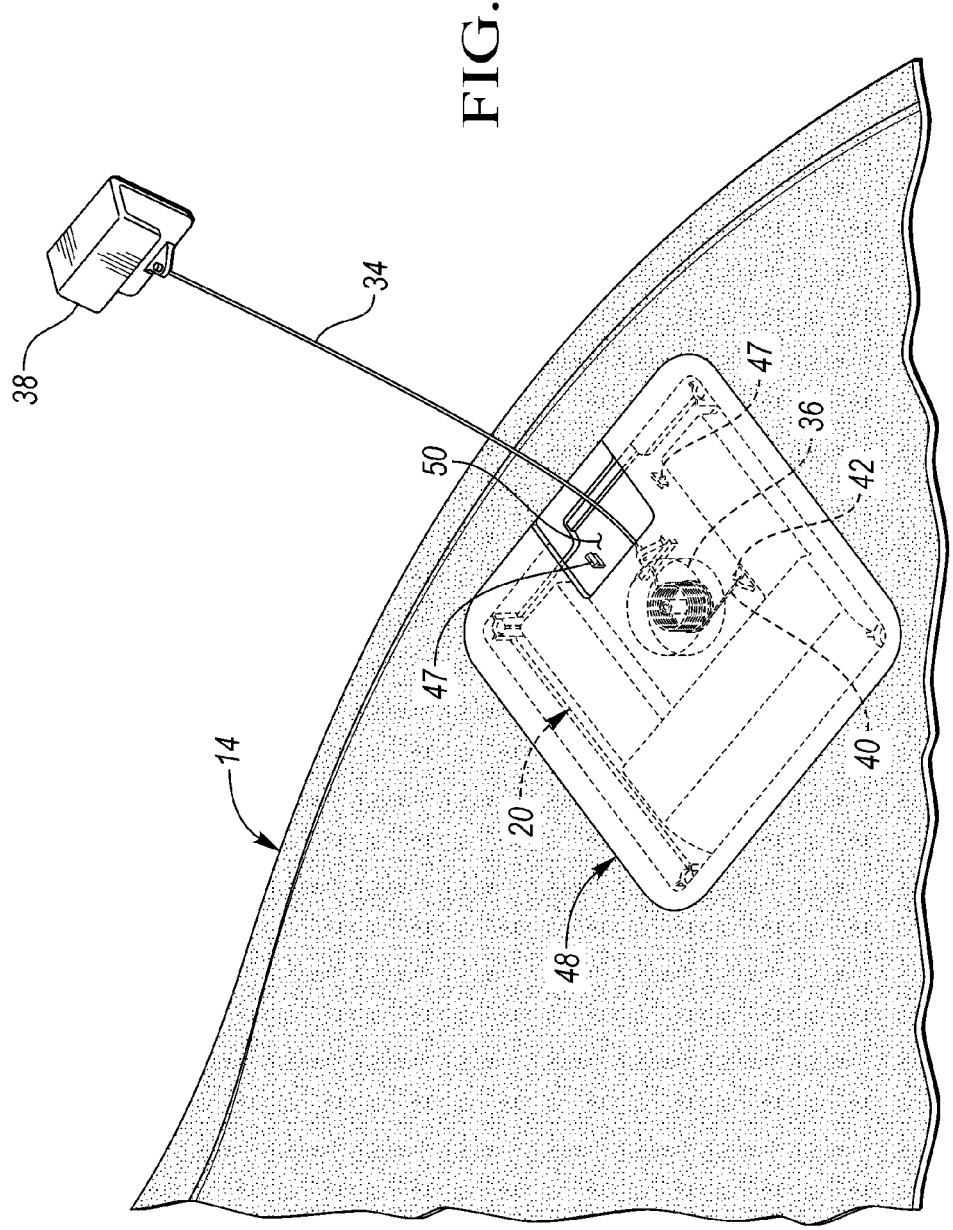
FIG. 5 illustrates the bottom side of the trim assembly in which the trim assembly is attached to the load floor and the spring-loaded retractable device is in an extended position.

Referring to FIGS. 4 and 5, the bottom sides of the trim assembly 20 and the load floor 14 are illustrated. The spring-loaded retractable device 24 is shown in a retracted position in FIG. 4 and in an extended position in FIG. 5. The spring-loaded retractable device 24 may include an extendable/retractable wire 34. The extendable/retractable wire 34 may be made from any long thin material such as metal wire, plastic wire, fabric or textile threading, etc. A first end of the extendable/retractable wire 34 may be connected to a spool 36 and a second end of the extendable/retractable wire 34 may be connected to a hook 38. The spool 36 may be rotatably connected to the bottom side of the trim assembly 20. The extendable/retractable wire 34 and the hook 38 are configured to extend from the trim assembly 20 and the load floor 14. The hook 38 may also be configured to secure the load floor 14 to the vehicle 10 in the open position 18. Other devices that are capable of securing the load floor 14 to the vehicle 10 in the open position 18, such as hook and loop fasteners, may be used in place of the hook 38. A torsional spring 40 may be connected to the spool 36 biasing the extendable/retractable wire 34 and the hook 38 in the retracted position. The torsional spring 40 may also be connected to a retaining device 42 in order to ground the torsional spring 40 to the trim assembly 20.

The hook 38 may be retractable into a recess 44 in the load floor 14. The hook 38 may also be retractable into a recess 46 in the trim assembly 20. The hook 38 may be retracted into the recess 44 in the load floor 14 or the recess 46 in the trim assembly 20 when the load floor 14 is in the closed position 16.

A snap-in feature 47 may be utilized to secure the hook 38 in the retracted position. The snap-in feature 47 may include a series of spaced apart locking tabs. The locking tabs of the snap-in feature 47 may be spaced apart at a distance that is approximately equal to or less than the width of the hook 38. When the hook 38 is moved into the retracted position, the locking tabs of the snap-in feature 47 may be displaced in an outward direction allowing the hook 38 to move into the spacing in-between the locking tabs. Once the hook 38 has moved into place, the locking tabs of the snap-in feature 47 may spring back into their original position to retain the hook 38 in the retracted position. The locking tabs of the snap-in feature 47 may have a ramping portion that allows the hook 38 to push against and deflect the locking tabs when moving into the retracted position. The locking tabs may also include a flat portion located below the ramping portion that secures the hook 38 in the retracted position once the locking tabs have sprung back into their original position. The snap-in feature 47 may be a separate piece that is attached to the trim assembly 20 or the snap-in feature may be an integral part of the trim assembly 20 itself. Although the snap-in feature 47 has been described as a series of locking tabs, the disclosure should not be limited to snap-in features that have locking tabs to secure the hook 38 in the retracted position. Other devices capable of securing the hook 38 in the retracted position are also contemplated.

A cover plate 48 may be secured to the bottom side of the load floor 14 covering the bottom side of the trim assembly 20. A slot 50 may be cut into the cover plate 48 providing access to the spring-loaded retractable device 24. More specifically the slot 50 may provide access to the hook 38 or equivalent device capable of securing the load floor 14 to the vehicle 10 in the open position 18.

In the alternative, other devices that are capable of securing the load floor 14 to the vehicle 10 in the open position 18 may be used in place of the hook 38. For example, a hook and loop fastener system, such as Velcro®, may be used. The hook and loop fastener configuration would include a hook portion and a loop portion. Either the hook portion or the loop portion of the hook and loop fastener configuration may be connected to the extendable/retractable wire 34 of the spring-loaded retractable device 24. The portion of the hook and loop fastener configuration that is not connected to the extendable/retractable wire 34, whether it be the hook portion or the loop portion, may be connected to the vehicle 10. In this alternative embodiment, the extendable/retractable wire 34 and the portion of the hook and loop fastener configuration that is connected to the extendable/retractable wire 34 are configured to extend from the trim assembly 20 and the load floor such that the portion of the hook and loop fastener configuration that is connected to the extendable/retractable wire 34 may be connected to the portion of the hook and loop fastener configuration that is connected to vehicle 10 in order to secure the load floor 14 to the vehicle 10 in the open position 18.

Also in the alternative, a button and loop configuration may be used in place of the hook 38 to secure the load floor 14 to the vehicle 10 in the open position 18. In this configuration, a strap that includes a button, snap button, snap fastener, button fastener, or other appropriate type of fastener may be connected to the extendable/retractable wire 34 of the spring-loaded retractable device 24. The strap that includes the snap button (or other type of fastener) and extendable/retractable wire 34 are configured to extend from the trim assembly 20 and the load floor such that the strap passes through a loop that is connected to the vehicle 10. Once the strap has passed through the loop, the snap button may be used to secure the strap around the edge of the loop. The loop may be separate piece that is attached to the vehicle 10 or an integral part of the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a load floor partially defining a trunk of the vehicle and movable from a closed position to an open position to provide access to a storage cavity thereunder; and
   a spring-loaded retractable device attached with and configured to extend from the load floor via an extendable/retractable wire and secure the load floor to the vehicle in the open position.

2. The vehicle of claim 1, wherein a first end of the extendable/retractable wire is connected to a spool.

3. The vehicle of claim 2, wherein a second end of the extendable/retractable wire is connected to a hook that secures the load floor to the vehicle in the open position.

4. The vehicle of claim 3, wherein a torsional spring connected to the spool biases the hook in a retraced position.

5. The vehicle of claim 4, wherein the hook is retractable into a recess in the load floor.

6. A vehicle comprising:
   a load floor defining an aperture; and
   a trim assembly mounted within the aperture and having a handle arranged on a top side of the load floor and a spring-loaded retractable device arranged on a bottom side of the load floor, wherein the handle is configured to assist in moving the load floor from a closed position to an open position and wherein the spring-loaded retractable device is configured to secure the load floor to the vehicle in the open position.

7. The vehicle of claim 6, wherein a cover plate is secured to the bottom side of the load floor and wherein the cover plate has a slot for accessing the spring-loaded retractable device.

8. The vehicle of claim 7, wherein the spring-loaded retractable device is retractable into a recess in the trim assembly.

9. The vehicle of claim 6, wherein the spring-loaded retractable device includes an extendable/retractable wire.

10. The vehicle of claim 9, wherein a first end of the extendable/retractable wire is connected to a spool and the spool is rotatably connected to the trim assembly.

11. The vehicle of claim 10, wherein a second end of the extendable/retractable wire is connected to a hook that secures the load floor to the vehicle in the open position.

12. The vehicle of claim 11 further comprising a torsional spring connected to the spool and configured to bias the hook in a retraced position.

13. The vehicle of claim 6, wherein the handle has an open position and a closed position.

14. The vehicle of claim 13, wherein the handle is biased in the closed position.

15. A vehicle comprising:
   a load floor movable from a closed position to an open position to provide access to a storage cavity thereunder;
   a trim assembly, having a top side and a bottom side, disposed on the load floor;
   a handle connected to the top side of the trim assembly;
   a spool rotatably connected to the bottom side of the trim assembly;
   an extendable/retractable wire having a first end and a second end, the first end connected to the spool;
   a hook connected to the second end of the extendable/retractable wire and configured to extend from the load floor and secure the load floor to the vehicle in the open position; and
   a torsional spring connected to the spool and configured to bias the extendable/retractable wire and the hook in a retracted position.

16. The vehicle of claim 15, wherein the hook is retractable into a recess in the trim assembly.

17. The vehicle of claim 16, wherein the hook is retracted into the recess when the load floor is in the closed position.

18. The vehicle of claim 15, wherein the load floor partially defines a cargo area of the vehicle.

* * * * *